July 8, 1952 L. H. SILVERNAIL 2,602,755
THERMOPLASTIC COMPOSITIONS OF WATER-SOLUBLE CELLULOSE ETHERS
Filed Jan. 2, 1951
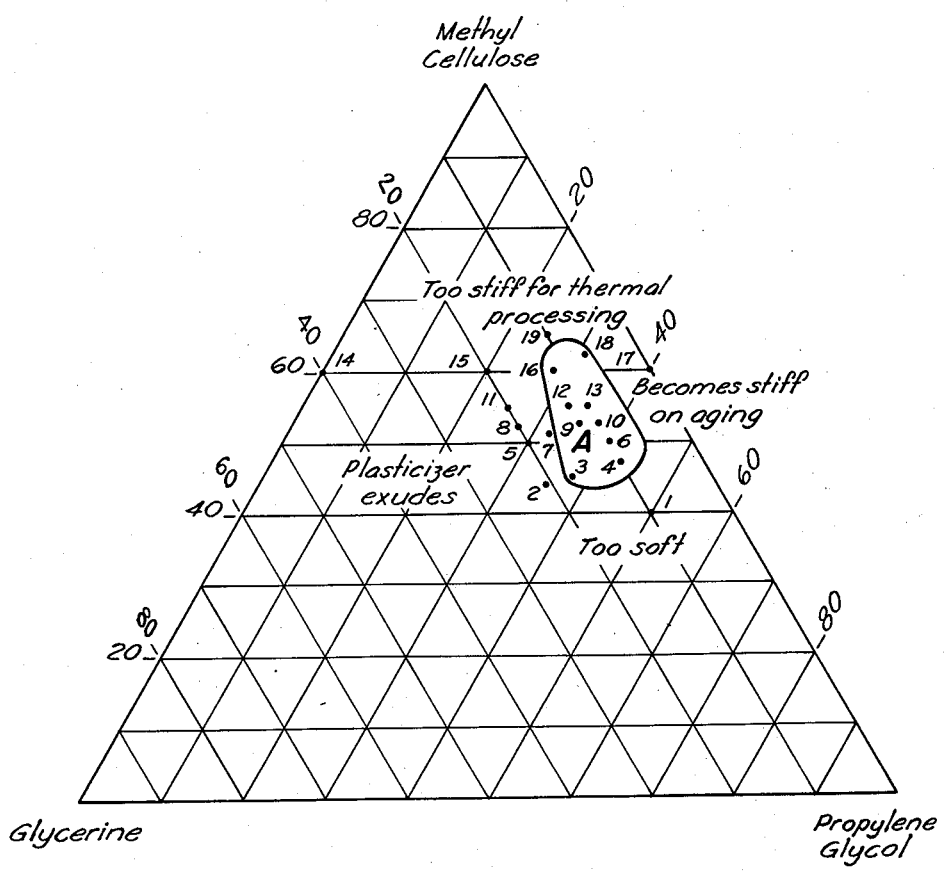
INVENTOR.
Lloyd H. Silvernail
BY
Griswold & Burdick
ATTORNEYS Patented July 8, 1952

2,602,755

UNITED STATES PATENT OFFICE 2,602,755

THERMOPLASTIC COMPOSITIONS OF WATER-SOLUBLE CELLULOSE ETHERS

Lloyd H. Silvernail, Midland, Mich., assignor to The Dow Chemical Company, Midland, Mich., a corporation of Delaware Application January 2, 1951, Serial No. 203,877

4 Claims. (Cl. 106—189)

This invention relates to thermoplastic compositions of certain water-soluble cellulose ethers which are themselves non-thermoplastic.

It is well-known that methyl cellulose, and various other cellulose ethers which are soluble in aqueous media, differ in their solubility properties depending on the extent to which they are etherified. The least etherified products are soluble only in dilute alkaline media, and often only at low temperatures. The somewhat more highly etherified materials are soluble in water. In a few cases, the fully etherified compounds become insoluble in water and are soluble only in organic solvents. The present invention is concerned only with the cellulose ethers which are normally soluble in water, and which are not thermoplastic materials. Such compounds merely decompose, and do not soften, when heated.

In order to make films from the water-soluble cellulose ethers, it has heretofore been necessary to dissolve the cellulose ether in water, with or without the presence of a small amount of a material which will act as a humectant in the film, and to spread the aqueous solution on a support and allow the water to evaporate therefrom. It would be preferable to be able to make thicker articles, or those of more intricate shapes, than can be made by such a method, and it has been a cause for regret that the water-soluble cellulose ethers have not been adapted to thermal fabrication operations such as molding or extrusion.

It is an object of the present invention to provide a composition consisting chiefly of a water-soluble cellulose ether, which composition is capable of being thermally fabricated, as by molding or extrusion. A particular object is to provide such a composition based on the water-soluble hydroxy alkyl ethers of cellulose and the methyl ethers of cellulose, including methyl cellulose itself and the mixed methyl hydroxy-alkyl ethers such as methyl hydroxypropyl cellulose. Other objects may become apparent from the following description of the invention.

It has now been found that powdered methyl cellulose, hydroxyalkyl celluloses, or methyl hydroxyalkyl celluloses, of the water-soluble variety, may be blended with a particular narrow range of mixtures of propylene glycol and glycerine to provide compositions which can be molded or extruded when pressure is applied at temperatures of 150° to 170° C., without decomposition. The new compositions provide soft and flexible films, tubes and filaments, and tough molded articles, such as capsules, especially when the water-soluble cellulose ether employed is one whose 2 per cent solution in water at 20° C. has a viscosity below 150 centipoises. Those with a viscosity below 50 centipoises are preferred.

The thermoplastic compositions of the present invention contain at least 43 and not over 64 per cent by weight of the water-soluble cellulose ether, at least 26 and not over 45 per cent of propylene glycol, and at least 6 and not over 18 per cent of glycerine, all as further defined and limited by the area A on the composition chart which constitutes the single figure of the accompanying drawing. With larger amounts of the cellulose ether, (65 per cent or more), the compositions are too stiff and cannot be molded or extruded under normal conditions of temperature and pressure for such operations. With less than 43 per cent of the cellulose, the compositions are too soft, and may not retain their form when molded or extruded. Compositions containing amounts of propylene glycol and glycerine lying to the left of the area A exude plasticizer badly after being thermally shaped, while those to the right of area A give shaped products which become brittle on aging.

Many agents have been proposed as humectants and softeners for water-soluble methyl cellulose, and they serve a like function with the water-soluble hydroxyalkyl and methylhydroxyalkyl ethers of cellulose. The commonest such agents include the polyhydric alcohols and their partial ethers or esters. It has now been found that, while such agents may serve as humectants in the cellulose ethers, few of them have the necessary combination of solvent properties and low volatility to be practical aids in making thermoplastic compositions from these non-thermoplastic cellulose ethers. It has been found, further, that no single one of the suggested agents gives the desired properties to the cellulose ether both before and after molding, but that the described composition of the cellulose ether, propylene glycol and glycerine is thermoplastic and gives thermally formed articles which retain their toughness, and resist embrittlement on aging.

It has been found that thermally shaped articles made from mixtures of one of the water-soluble cellulose ethers and a polyhydric alcohol lose some of the plasticizer during the first few days after their preparation, and then reach equilibrium conditions which are retained indefinitely thereafter. It is necessary, therefore, that the amount and kinds of plasticizer employed be such as will provide both the initial thermoplasticity to the composition and the required retention of properties when equilibrium conditions are reached during aging of the thermally formed articles.

Compositions illustrating these problems, and their solution, were prepared from a powdered water-soluble cellulose ether and various polyhydric alcohols. The mixtures were heated to 150° C. in an extruder, and were extruded in the form of thin sheets. These were aged in air at 75° C. and 50 per cent relative humidity, and weighed samples were analyzed daily to determine the amount of plasticizer remaining therein. The physical properties of the sheet were noted. Typical results are recorded in the following Table I, wherein composition X consisted of 60 per cent methyl cellulose and 40 per cent propylene glycol; composition Y consisted of 52.5 per cent methyl cellulose, 27.5 per cent propylene glycol and 10 per cent glycerine; and composition Z consisted of 52.5 per cent methyl cellulose, 27.5 per cent propylene glycol and 20 per cent glycerine. It had been determined that the methyl cellulose could not be formed into readily extrudable compositions with glycerine alone, and that any such composition, even if molded, gave stiff, brittle products or ones from which the glycerine exuded badly.

*Table I*

| Days Aging Time | Per Cent Plasticizer Remaining—Composition | | |
|---|---|---|---|
| | X | Y | Z |
| 0 | 40 | 47.5 | 47.5 |
| 1 | 25 | 27.5 | 30.5 |
| 2 | 20 | 23.5 | 30 |
| 3 | 17 | 22 | 30 |
| 4 | 15.5 | 21.5 | 30 |
| 5 | 14.5 | 21.5 | 30 |
| 6 | 14 | 21 | 30 |
| 7 | 13.5 | 21 | 30 |
| 8 | 12.5 | 21 | 30 |

Compositions Y and Z gave films which reached equilibrium within about 3 days, and which remained tough and flexible thereafter. Films made from Composition X did not reach equilibrium even after 8 days, and by that time they were stiff and brittle, resembling the films which can be made from aqueous solutions of unplasticized, or insufficiently plasticized methyl cellulose.

These and other tests, made on films and on compression and injection molded samples, showed the necessity for using a mixture of humectants as the plasticizer, and defined the useful range of proportions, which is essentially the same for methyl cellulose, methyl hydroxyethyl cellulose, methyl hydroxypropyl cellulose, hydroxyethyl cellulose and hydroxypropyl cellulose of the water-soluble types. No thermoplastic compositions were found in similar studies of the water-soluble carboxymethyl cellulose or methyl carboxy-methyl cellulose.

The optimum plasticizer combination, determined from the ease of thermal fabrication of the compositions, was found to be propylene glycol and glycerine. These materials have the further advantage of being non-toxic and are approved for use in materials which may come in contact with foods, as well as for use in capsules or other materials which will be ingested. The useful ratios of the cellulose ether, propylene glycol and glycerine represented by area A of the drawing, were defined from the following and similar data on molded and extruded samples of numerous compositions.

*Table II*

| Methyl Cellulose | Propylene Glycol | Glycerine | Product description and remarks |
|---|---|---|---|
| 1. 40 | 50 | 10 | Clear product. Too soft. Low strength. |
| 2. 44 | 35 | 21 | Clear product. Plasticizer exudes. |
| 3. 45 | 38 | 17 | Very clear. No exudation. Soft. |
| 4. 47.5 | 42.5 | 10 | Very clear, pliable, soft. |
| 5. 50 | 30 | 20 | Plasticizer exudes. Molds easily. |
| 6. 50 | 40 | 10 | Excellent sheet, soft and pliable. |
| 7. 51 | 32 | 17 | Plasticizer exudes. |
| 8. 52.5 | 27.5 | 20 | Do. |
| 9. 52.5 | 35 | 12.5 | Excellent sheet, clear, soft, strong. |
| 10. 52.5 | 37.5 | 10 | Excellent sheet, soft and pliable. |
| 11. 55 | 25 | 20 | Plasticizer exudes. |
| 12. 55 | 32.5 | 12.5 | Molded sheets clear, soft and strong. |
| 13. 55 | 35 | 10 | Good sheet. Stiffer than 4, 6 or 10. |
| 14. 60 | | 40 | Plasticizer exudes badly. Product stiff. |
| 15. 60 | 20 | 20 | Plasticizer exudes. Sheet not homogeneous. |
| 16. 60 | 28 | 12 | Clear, tough, strong moldings. |
| 17. 60 | 40 | | Clear and strong. Becomes brittle on aging. |
| 18. 62 | 31 | 7 | Clear, strong moldings. Slightly stiff. |
| 19. 65 | 25 | 10 | Stiff, non-homogeneous molding. |

The results reported in the foregoing Table II were obtained on compositions containing water-soluble methyl cellulose of the 25 centipoise type. Similar and conforming data have been obtained on other water-soluble methyl celluloses of higher viscosity ratings, up to 150 centipoises, and on methyl hydroxyalkali celluloses and hydroxyalkyl celluloses in the same viscosity ranges. In higher viscosity grades, more plasticizer is required to facilitate molding or extrusion. Thus, for both methyl cellulose and methyl hydroxypropyl cellulose of the water-soluble types, a composition of 52.5 per cent cellulose ether, 35 per cent propylene glycol and 12.5 per cent glycerine is thermoplastic and gives excellent molded and extruded products which are clear and tough. For both methyl cellulose and hydroxyethyl cellulose of the water-soluble types, a composition of 50 per cent cellulose ether, 40 per cent propylene glycol and 10 per cent glycerine may be thermally extruded and gives soft and pliable, tough sheets or filaments.

Within the area A on the accompanying drawing, the preferred compositions are those in which the amount of glycerine employed is from 10 to 12.5 per cent of the weight of the composition.

I claim:

1. A thermoplastic composition consisting essentially of (1) a water-soluble and non-thermoplastic cellulose ether selected from the group consisting of methyl cellulose, methyl hydroxyethyl cellulose, methyl hydroxypropyl cellulose, hydroxyethyl cellulose and hydroxypropyl cellulose, (2) propylene glycol and (3) glycerine, all in proportions represented by area A on the annexed drawing.

2. The composition claimed in claim 1, wherein the cellulose ether is a water-soluble and non-thermoplastic methyl cellulose.

3. The composition claimed in claim 1, wherein the cellulose ether is a water-soluble and non-thermoplastic methyl hydroxypropyl cellulose.

4. The composition claimed in claim 1, wherein the amount of glycerine employed is from 10 to 12.5 per cent of the weight of the composition.

LLOYD H. SILVERNAIL.

REFERENCES CITED

The following references are of record in the file of this patent:

UNITED STATES PATENTS

| Number | Name | Date |
|---|---|---|
| 2,306,887 | Klose | Dec. 29, 1942 |
| 2,440,626 | Young et al. | Apr. 27, 1948 |
| 2,479,037 | Chambers et al. | Aug. 16, 1949 |